J. ZIENCIK.
POTATO DIGGER.
APPLICATION FILED NOV. 18, 1914.

1,136,461.

Patented Apr. 20, 1915.
5 SHEETS—SHEET 2.

Witnesses
S. Z. Torosiewicz
[signature]

Inventor
J. Ziencik
By [signature]
Attorney

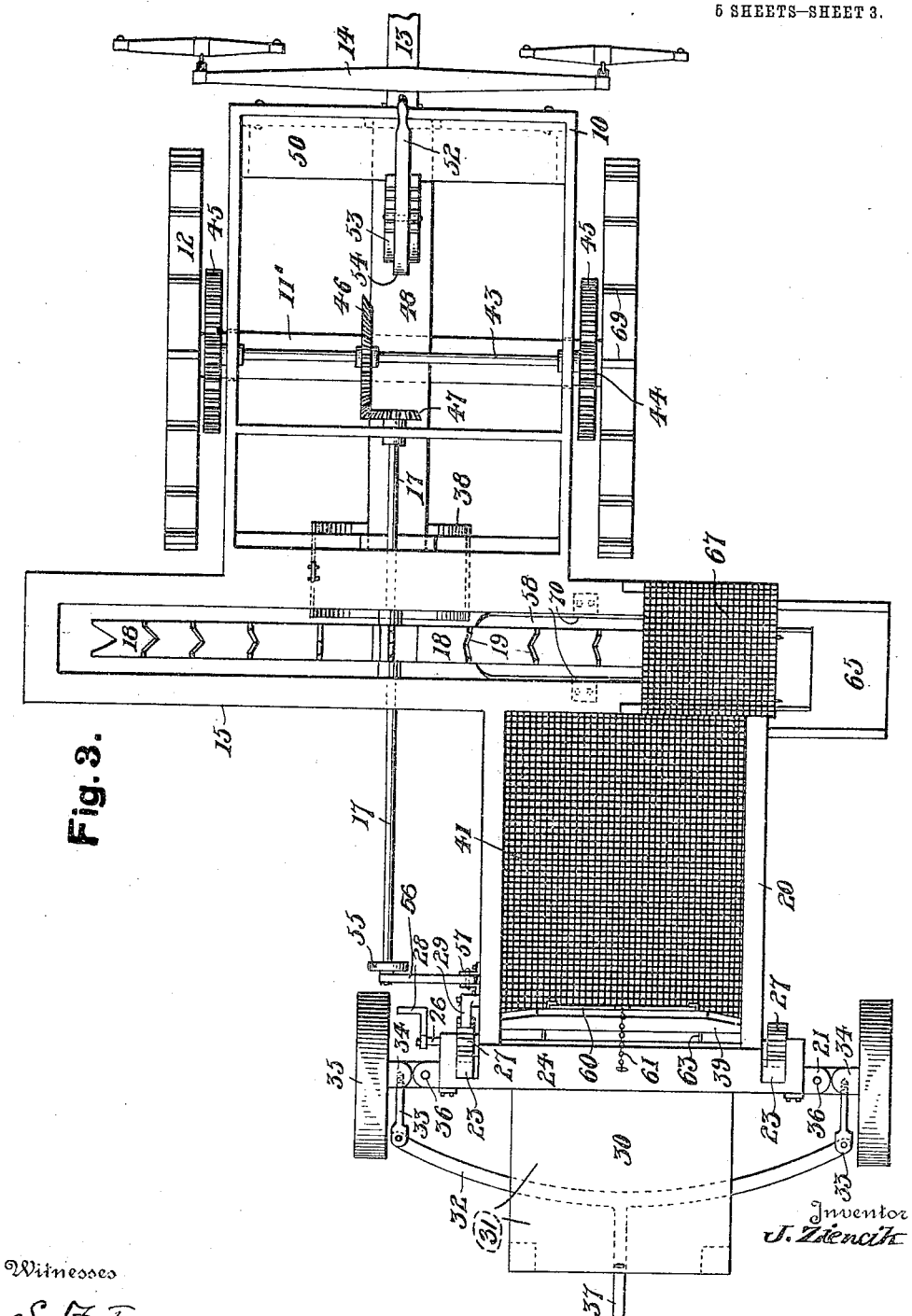

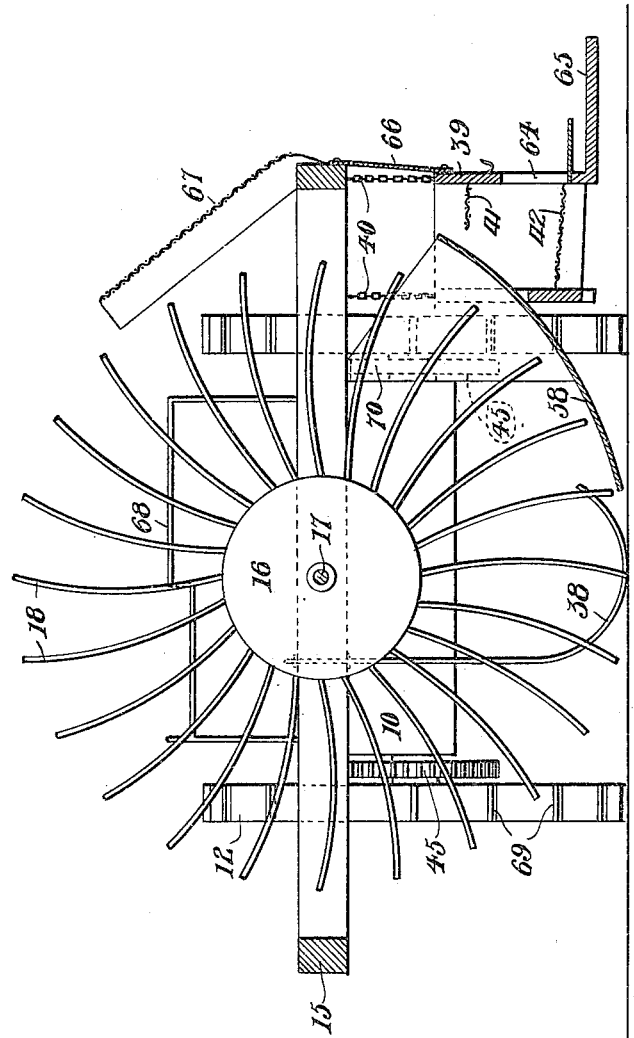

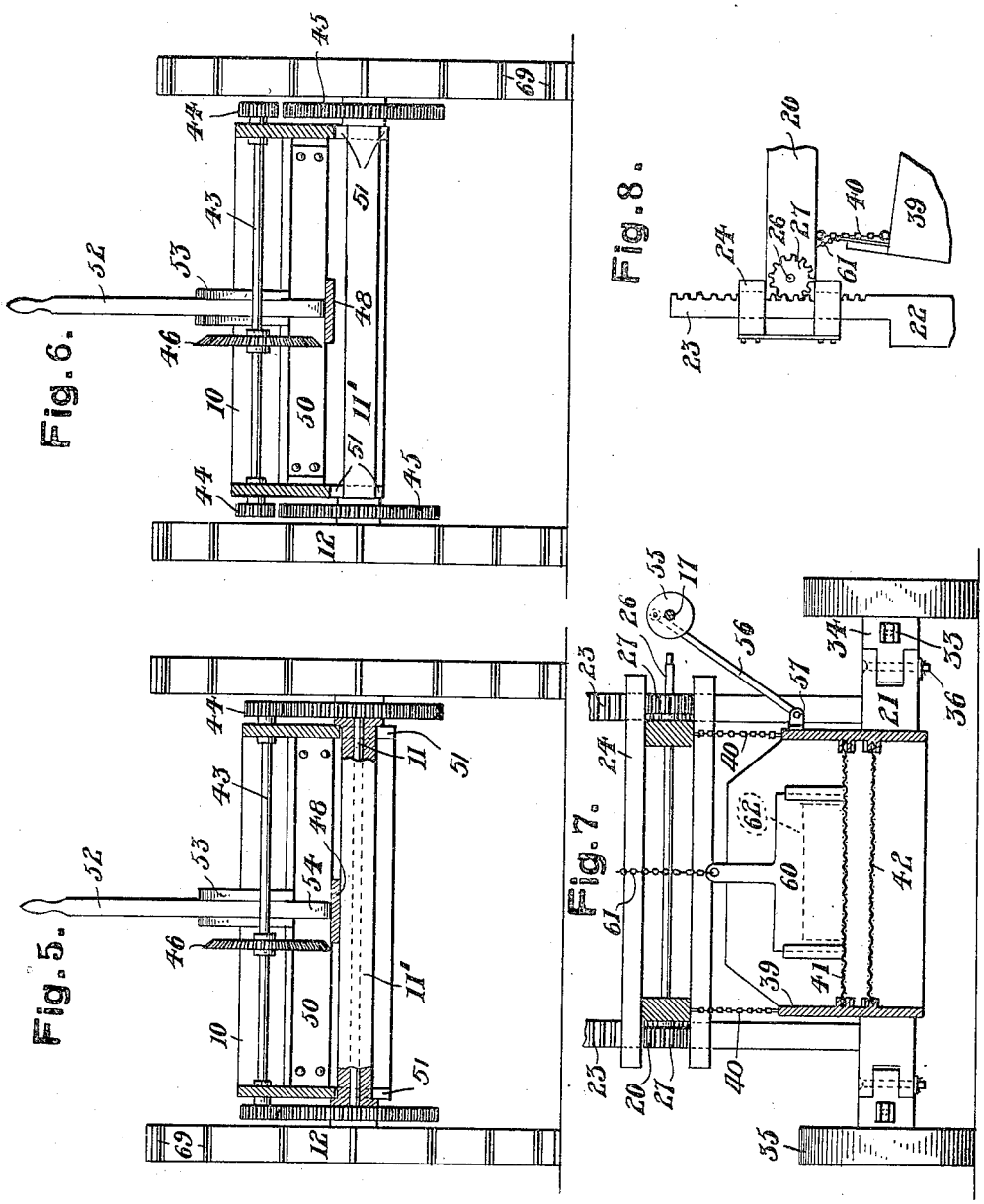

UNITED STATES PATENT OFFICE.

JOHN ZIENCIK, OF NEW KENSINGTON, PENNSYLVANIA.

POTATO-DIGGER.

1,136,461.   Specification of Letters Patent.   Patented Apr. 20, 1915.

Application filed November 18, 1914. Serial No. 872,742.

*To all whom it may concern:*

Be it known that I, JOHN ZIENCIK, a subject of the Emperor of Austria-Hungary, residing at New Kensington, in the county of Westmoreland and State of Pennsylvania, have invented certain new and useful Improvements in Potato-Diggers, of which the following is a specification.

This invention relates to certain new and useful improvements in potato diggers.

The primary object of the invention is to provide a digger in the form of a vehicle either manually or motor drawn and being capable of digging, elevating and grading potatoes during the continuous movement of the vehicle across the field.

A further object is the provision of a vehicle having forward traction wheels and rear steering wheels, the former communicating power to a shaking potato grader which receives the potatoes from a transversely moving elevating wheel from a point rearwardly of the potato plow or unearthing mechanism.

A still further object is to provide a potato plow upon a vehicle and means for elevating the dug potatoes to a vibrating potato sorter which latter is adapted to deliver the large sized potatoes to a rear bagging platform and the smaller sized potatoes to a similar side platform.

With these general objects in view and others that will appear as the nature of the invention is better understood, the same consists in the novel combination and arrangement of parts to be hereinafter more fully described, illustrated in the accompanying drawings, and set forth in the appended claims.

Figure 1:
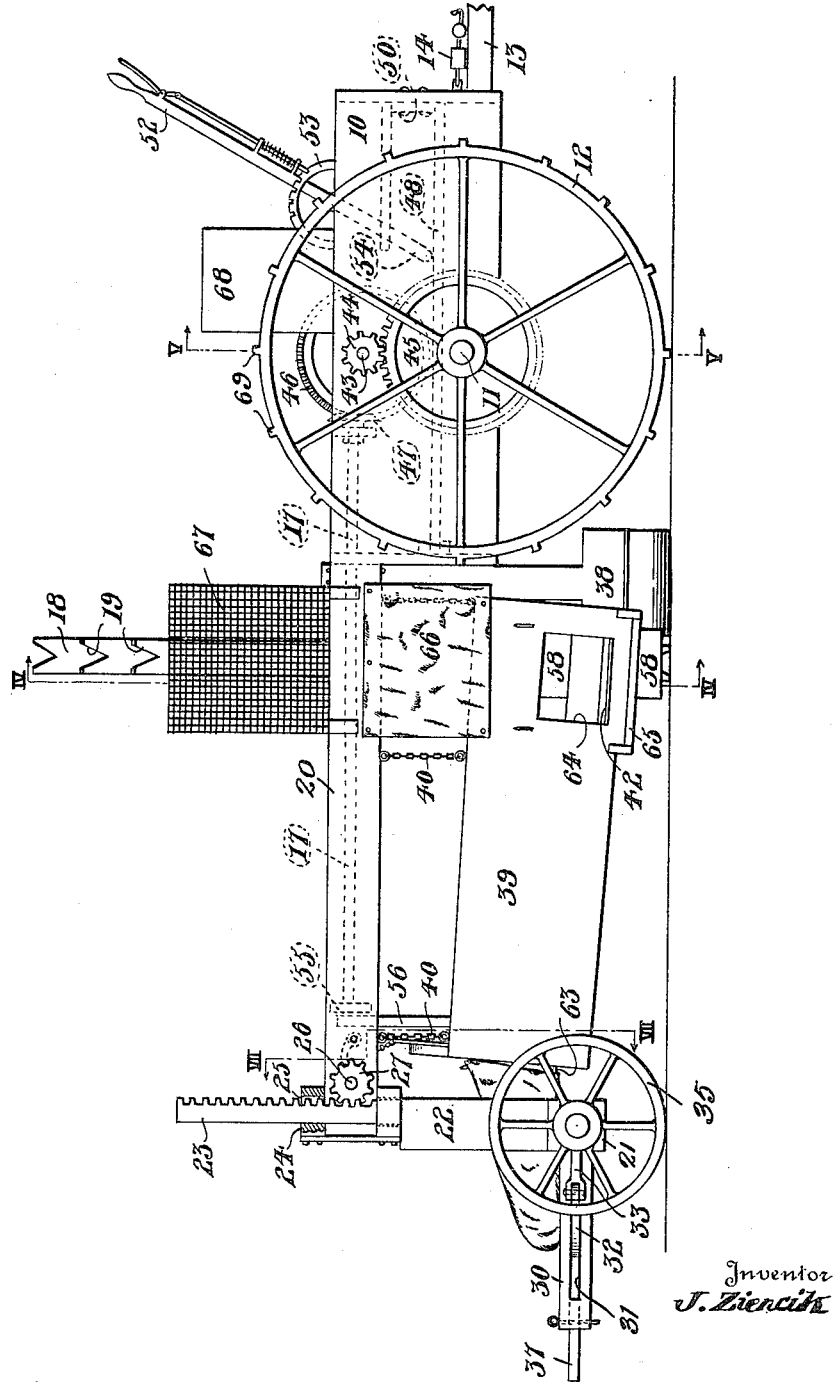
Figure 2:
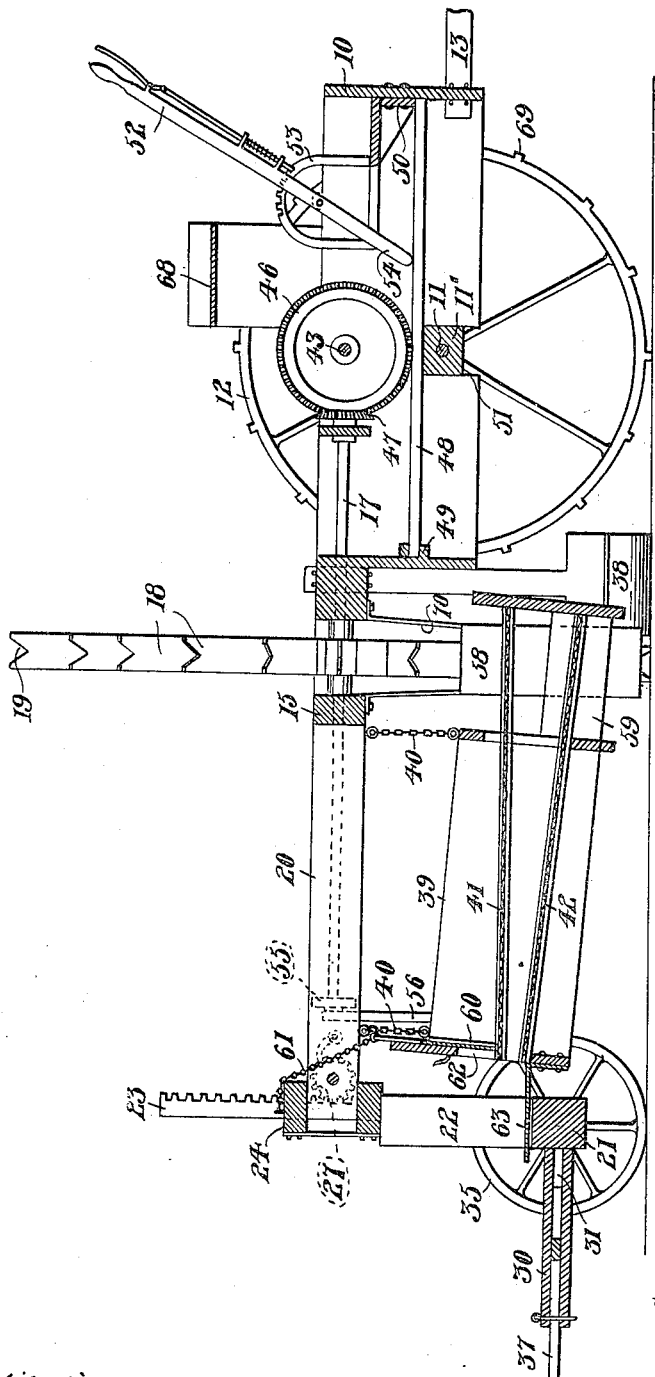

In the drawings forming a part of this application and in which like-designating characters refer to corresponding parts throughout the several views, Figure 1 is a side elevation of the device. Fig. 2 is a central vertical longitudinal sectional view thereof. Fig. 3 is a top plan view thereof. Fig. 4 is a vertical transverse sectional view taken upon line IV—IV of Fig. 1. Fig. 5 is a similar sectional view taken upon line V—V of Fig. 1, showing the operating gears in meshing relations. Fig. 6 is a similar view showing the gears out of their operating meshing engagement. Fig. 7 is a vertical transverse sectional view upon line VII—VII of Fig. 1, and Fig. 8 is a detail fragmentary view of one end of the frame-tilting means.

Referring more in detail to the drawings the device comprises a vehicle body 10 in the form of a rectangular frame which is mounted upon a revolving axle 11 journaled through a beam 11' transversely and substantially centrally thereof, the said axle being provided on its opposite outer ends with traction wheels 12 fixed thereto. A tongue 13 is secured forwardly of the body 10 for drawing the device forwardly and may be provided with a whiffle-tree 14 for attaching the draft animals thereto. A transversely positioned elongated rectangular frame 15 is secured at the rear of the vehicle body 10 and has a wheel 16 centrally journaled therein upon a revoluble shaft 17. The said wheel 16 is serviceable as a potato elevator and is provided with slightly curved substantially radially positioned projecting blades or arms 18 extending so as to touch the ground beneath the frame 15 and having V-shaped incisions 19 at their outer free ends.

A substantially square frame 20 is secured rearwardly to the transverse frame 15 and substantially in the rear of one of the traction wheels 12 so that the said square frame is at one side of the central longitudinal axis of the main vehicle body. A rear axle 21 has upright posts 22 adjacent its opposite ends which are provided with vertical toothed racks 23 upon the tops thereof. The square frame 20 has rear beams 24 provided with vertical openings 25 through which the racks 23 are slidably mounted. A transverse rod 26 is carried by the square frame 20 adjacent the rear end thereof and is provided with exteriorly positioned pinion wheels 27 fixed thereon and in constant mesh with the said rack 23. One end of the rod 26 is provided with a crank 28 for turning the pinions 27 and whereby the entire combined frame may have its rear end vertically adjusted, a pawl 29 being carried by the frame 20 and engageable with one of the pinions 27 to retain the frame in its adjusted position.

The rear axle 21 is provided with a rearwardly projecting horizontal platform 30 having a central space 31 for the accommodation of a shiftable yoke 32 which has its opposite ends pivotally connected to the rearwardly projecting arms 33 of the steering knuckles or stub axles 34 of the rear wheels 35 which stub axles are pivoted as at 36 to the opposite ends of the said rear axle 21. The yoke 32 is provided with a rearwardly extending arm 37 which projects rearwardly of the platform 30 and by means of which the course or direction of the said wheels 35 may be changed for steering the vehicle.

A plow 38 adapted for excavating the potatoes during a passage of the vehicle across the field is secured at the rear of the main body 10 and engages the earth substantially beneath the central longitudinal axis of said body and slightly in advance of the bladed wheel 16. A potato sorter or grader 39 is provided which is suspended by means of chains 40 beneath the square frame 20 and is provided with an upper rearwardly inclined screen or grating 41 of relatively large mesh, while a screen 42 which is forwardly inclined and being a finer mesh is positioned therebeneath.

The body 10 is provided with a substantially central shaft 43 transversely journaled therein and provided on its opposite ends exteriorly of the body 10 with pinions 44 which are adapted to mesh with gears 45 fixed to the revoluble axle 11 of the traction wheels 12. A beveled gear 46 is provided upon the shaft 43 in constant mesh with a beveled pinion 47 secured to the forward end of the aforementioned shaft 17. A strip 48 is positioned within the body 10 extending upon substantially the longitudinal axis thereof and rests upon the said axle 11, having its rear end pivoted within a bracket 49 and its forward end resting beneath a cleat 50. The said body 10 is provided with opposite side slots 51 and the beam 11' being mounted within the said slots, the body is shiftable vertically relatively thereto. A lever 52 is pivoted to a rack bracket 53 carried by said body 10 and has its lower end 54 resting upon the strip 48.

When the lever 52 is in its forward inclined position as illustrated in Figs. 1, 2, 3 and 5 of the drawings, the strip 48 will engage the cleat 50 and the body will be in its lowermost position with the pinions 44 in mesh with the gears 45. By moving the lever 52 to a vertical or rearwardly inclined position, the lower end 54 engaging the strip 48 will force the forward end of the body 10 with the cleat 50 in spaced relation above the strip 48 thereby elevating the pinions 44 above and out of mesh with the gears 45 as shown in Fig. 6.

Upon propelling the device forwardly by means of the tongue 13 and with the lever 52 positioned as shown in Figs. 2 and 3, the turning of the traction wheels 12 revolves the gear 46 and turns the shaft 17 and its wheel 16 and also a disk 55 concentrically mounted upon the free rear end of the said shaft 17. A pitman 56 is eccentrically pivoted at one end to the disk 55 while its other end is hinged to a bracket 57 upon the adjacent side of the grader 39.

During the forward travel of the vehicle, the plow 38 removes the potatoes from the soil and the bladed wheel 16 positioned slightly rearwardly thereof hoes up the potatoes and forces them upwardly upon the inclined platform 58 which platform extends above the screen 41 so that the potatoes are deposited over the top of the platform 58 and upon the said screen, the same being so deposited in the forward contracted end portion 59 of the grader. The revolving of the shaft 17 and its disk 55 imparts transverse shaking movement to the grader 39 by means of the pitman 56, so that the smallest potatoes pass through the meshes of the screen 41 and are caught upon the lower screen 42. The grader is provided with a vertically movable rear gate 60 which may be elevated by means of a chain 61 for the purpose of allowing the potatoes from the screen 41 to pass out of the exit door 62 and onto the grader platform 63 and thence to the main rear platform 30 of the device where the potatoes may be placed in sacks or suitable receptacles.

The smaller potatoes which are upon the screen 42 will pass to the lower forward end thereof for passing out of the side opening 64 of the grader and onto the platform 65 at the side thereof where the potatoes are placed within sacks or suitable receptacles. A curtain 66 is secured between the end of the frame 15 and the adjacent side of the grader 39 which is positioned therebeneath, while an inwardly inclined screen 67 is attached to the same end of the frame and extends adjacent the wheel 16 for guarding the same and preventing the potatoes from leaving the device. It is to be further noted that a housing 68 may be provided if desired for slightly protecting the gearing upon the body 10 and the same may be employable as a seat for the operator of the device. The traction wheels are preferably provided with transverse gripping ribs 69. The inclined platform 58 is preferably suspended from the sides of the frame 15 by means of the parallel opposite sides 70 of the said platform, between which sides the wheel blades pass in forcing the potatoes therebetween and upwardly of the platform.

The complete operation of the device will thus be apparent and the serviceability thereof in excavating potatoes during a passage of the vehicle across a field as well as the elevating of the potatoes onto the grader 39 which is being shaken during the movement of the vehicle so that the larger potatoes on the screen 41 will pass out at the exit door 62, and the smaller potatoes on the screen 41 will pass out at the side opening 64.

While the forms of the invention herein shown and described are what are believed to be the preferred embodiments thereof, it is nevertheless to be understood that minor changes may be made therein without departing from the spirit and scope of the invention as claimed.

What I claim as new is:—

1. A potato digger comprising a forwardly positioned main body, traction wheels supportingly positioned therebeneath, a transversely positioned rectangular frame secured to the rear of said body, a substantially square frame rearwardly attached to said transverse frame and being positioned in alinement with one side and wheel of the body, and a potato-extracting plow positioned centrally beneath the device and suspended from the transverse frame adjacent the rear side of the main body.

2. A potato digger comprising forward and rear rectangular members offset from each other, a transversely positioned narrow rectangular frame positioned between the said members, traction wheels beneath said forward member, a longitudinal shaft carried by said forward member and journaled through said transverse frame, operative connections between the said traction wheels and said shaft, a bladed wheel rigid with said shaft and mounted within said transverse frame, and a potato-extracting plow carried by said transverse frame and mounted forwardly of said bladed wheel.

3. A potato digger comprising a forward rectangular frame, supporting traction wheels for said frame, an oblong frame positioned rearwardly and transversely of the forward frame, a rear rectangular frame positioned rearwardly of the oblong frame and centrally of one of the traction wheels, a revolving bladed wheel journaled in said oblong frame, and operative connections between said traction wheels and said bladed wheel.

4. A potato digger comprising a forwardly positioned main body, a transverse narrow rectangular frame secured rearwardly thereof, a square frame attached to the rear side of said transverse frame and offset with respect to the said body, traction wheels beneath the said body, a plow beneath said transverse frame, a potato grader suspended beneath the said square and transverse frame, a bladed elevating wheel journaled within said transverse frame, rearwardly of said plow, an inclined platform adjacent said bladed wheel and extending within said grader, and operating means for said bladed wheel and grader.

In testimony whereof I affix my signature in presence of two witnesses.

JOHN ZIENCIK.

Witnesses:
 PAWET LIENNESKI,
 FRENK SLAPIESKI.

Copies of this patent may be obtained for five cents each, by addressing the "Commissioner of Patents, Washington, D. C."